United States Patent [19]

Burch

[11] Patent Number: 4,889,579

[45] Date of Patent: Dec. 26, 1989

[54] PROCESS FOR ADHERING ARAMID POLYMERS

[75] Inventor: Robert R. Burch, Exton, Pa.

[73] Assignee: E. I. Du Pont de Nemours and Company, Wilmington, Del.

[21] Appl. No.: 226,248

[22] Filed: Jul. 6, 1988

[51] Int. Cl.$^4$ ................................................ C09J 5/00
[52] U.S. Cl. .................................... 156/305; 156/296; 156/308.8; 156/314; 264/123; 264/340; 264/343; 428/474.7
[58] Field of Search ...................... 264/123, 343, 340; 156/305, 314, 296, 308.8; 428/474.7

[56] References Cited

U.S. PATENT DOCUMENTS

| | | | |
|---|---|---|---|
| 2,201,741 | 5/1940 | Owens et al. | 264/340 |
| 3,393,111 | 7/1968 | Hofmann et al. | 156/305 |
| 3,723,241 | 3/1973 | Rakus et al. | 428/474.7 |

Primary Examiner—John J. Gallagher

[57] ABSTRACT

This invention concerns a method for adhering aramid polymers by treating them with strong base to create anionic sites on the polymer surface. Subsequent reprotonation adheres contacting aramid surfaces.

7 Claims, No Drawings

PROCESS FOR ADHERING ARAMID POLYMERS

BACKGROUND OF THE INVENTION

This invention concerns a method for adhering treated aramid polymers to each other and to untreated aramid-containing polymers and copolymers.

Takayanagi et al., J. Appl. Pol. Sci., 29, 2547 to 2559, (1984) disclose the use of aramid polyanions for the preparation of molecular composites in which aramid is blended with elastomers. In this procedure, the elastomer is dissolved in the DMSO solution of poly(paraphenylene terephthalamide) (PPTA) polyanion, and the mixture is precipitated by addition of water. This procedure involves complete dissolution of the PPTA.

Takayanagi et al., J. Appl. Pol. Sci., 27, 3903 to 17 (1982) disclose surface treatment of PPTA fibers with DMSO solutions of the dimsyl anion. Takayanagi et al., in Polymer Journal, Vol. 19, No. 5, pages 467 to 474 (1987) disclose the surface treatment of PPTA with epoxy resin.

Japanese Kokai 57-109851 discloses a reinforced polymer composition characterized in that N-alkaline metal salt of aromatic polyamide and polymer to be reinforced are mixed in common solvent, said N-alkaline metal salt of aromatic polyamide being regenerated to aromatic polyamide when said mixture is recovered from the common solvent, and said regenerated aromatic polyamide being contained in said polymer to be reinforced.

SUMMARY OF THE INVENTION

This invention concerns a method for adhering aramid structures comprising the steps, in sequence, of
 (i) treating the structure with strong base to create anionic sites on the aramid surface,
 (ii) contacting the treated polymer with an aramid-containing polymer to which it is to be adhered, and
 (iii) reprotonating the anionic sites on the treated polymer to adhere said polymer to the polymer with which it is in contact.

The aramid structures are treated, in step i, with solutions of strong base in a solvent for the base which is not a solvent for the polymer or at least is not a very good solvent for the polymer. In any event, the polymer is soluble in the base so it is important to employ base in sufficiently low concentration and/or to employ short contact times to effect surface treatment of the polymer without excessive polymer solution. The treated aramid polymer is then contacted with a proton donor and dried. It is also contemplated that intermediate drying of the treated polymer can be effected (between steps i and ii) before contact with the proton donor (step iii) which effects the adherence of contacting aramid surfaces.

The process is applicable to the preparation of aramid polymer matrices reinforced with aramid polymer fibers and is useful for the fabrication of bonded aramid fabrics, both woven and non-woven, fiber-reinforced aramid films, aramid fiber reinforced aramid matrices and also for the preparation of stiff bundles of aramid fibers.

Contemplated aramid polymers have at least one repeating unit selected from the group: p0 (a) —NHR$^1$-oCO—, (b) R$^{11}$—NHCONH—, and (c)

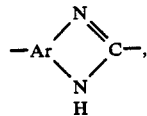

wherein:
R$^{10}$ is selected from R$^{13}$ and R$^{11}$NHCOR$^{12}$, R$^{11}$ and R$^{13}$, individually, are selected from m-phenlene, p-phenylene, 3,3'-biphenylene, 3,4,-biphenylene, 4,4'-biphenylene and 4,4'-diphenylene ether, R$^{12}$ is selected from R$^{11}$ and $-(CH_{2x})-$, Ar is an aryltriyl radical in which two of the three radical bonds are adjacent to one another and attached to nitrogen atoms, and x is 1 to 10, preferably 1 to 4. The depicted repeating units, polyamide, polyurea, and polybenzimidazole, respectively, can be substituted with one or more additional substituents that do not interfere with the adhesion process as described herein. Preferred among these optional substituents are halogen, most preferably chlorine and bromine, and $C_xH_{2x+1}$ wherein x is 1 to 10. Representative of contemplated aryltriyl radicals is 1,2,4-benzenetriyl.

When the polymer comprises repeating units of R$^{13}$ solely, it can be characterized as a homopolymer. Homopolymers are also formed when R$^{11}$ and R$^{12}$ are the same throughout the polymer. Copolymers result when R$^{11}$ and/or R$^{12}$, vary within the polymer matrix.

DETAILS OF THE INVENTION

The polymers amenable to the process of this invention should have weight average molecular weights of about 2500 or higher for best results. Preferred molecular weights are about 3300 or higher, indicated by an inherent viscosity of about 0.4 or greater measured at 0.5% concentration in concentrated (95% to 98%) sulfuric acid at 30° C.

Contemplated polymers include:
poly(paraphenylene terephthalamide) [PPTA],
poly(metaphenylene isophthalamide) [PMIA],
poly(parabenzamide),
poly(4,4'-biphenylene isophthalamide),
poly(benzamidizoles),
poly(chloroparaphenylene isophthalamide),
poly (paraphenylene urea) and copolymers of the above with each other and with small amounts of compatible polymers from other classes.

When copolymers are employed of aramids with copolymers from other classes, it has been found that the anionic sites are introduced on the surface of the aramid component and the adhesion occurs at contact locations between aramid components even though some portions of contacting surfaces do not have anionic sites, so long as there are sufficient anionic sites to effect the desired level of adherence. Consistent with this, it is contemplated that surface-treated aramids can be contacted with and adhered to aramid-containing copolymers comprising non-aramid component(s) that have not been surface-treated so long as there are sufficient anionic sites on the surfaces to be adhered that the desired level of binding can occur.

Strong bases which can be used in the process of the invention include alkali metal hydroxides (OH$^-$); R$^1$R$^2$N$^-$, wherein R$^1$ and R$^2$ are individually selected from the group $C_1$-$C_{12}$ alkyl, $C_6H_5$, $C_{10}H_7$, $C_{12}H_9$, C(=O)R$^3$, R$^3$=$C_1$-$C_{12}$ alkyl; CH$_2$CN$^-$; R$^4-$, R$^4$=$C_1$-$C_{12}$ alkyl; H$^-$; R$^5$SOR$^6-$, R$^5$ and R$^6$=$C_1$-$C_{12}$ alkyl; R$^7$O$^-$, R7=$C_1$-$C_{12}$ alkyl, and polyanions of the described aramid polymers. It will be understood by one skilled in the art that basic solutions of aramids also can be employed to generate the anionic sites on preformed aramid structures.

The preferred bases include $R^5SOR^{6-}$ and $RO^-$. The most preferred bases are $CH_2SOCH_3{-}$, potassium t-butoxide, and the polyanions of the aramid polymers described above either used alone or in the presence of alcohols or amines. The concentration of base in solution will usually be about 0.001 to 5 M, preferably 0.01 to 0.6 M. Suitable solvents include sulfoxides such as $R^8SOR^9$ wherein $R^8$ and $R^9=C_1$-$C_5$ alkyl. The most preferred solvent is dimethylsulfoxide (DMSO).

Solvent mixtures which are suitable include $R^8SOR^9$ with a polar non-protic solvent such as N-methylpyrrolidone or tetrahydrofuran. Methanol and other low molecular weight alcohols can be present in the solvent mixtures up to a molar ratio of base to alcohol of about 1:6. Preferred solvent mixtures contain at least >10% DMSO; most preferred solvent mixtures contain at least >50% DMSO.

The process can be operated at temperatures that vary depending on the particular solvent that is employed, typically being in the range between the melting and boiling points of said solvent. For example, when the solvent is DMSO, the temperature range will be 17° C. to 190° C. The preferred temperature range for all base/solvent systems is room temperature to about 60° C. The process can be operated most conveniently at a pressure of atmospheric to 35,000 psig.

Proton-donating solvents which are suitable for the invention include water and low molecular weight alcohols such as methanol and ethanol. Proton donating solutions which are suitable for the invention include aqueous solutions of HX, $X=F^-$, $Cl^-$, $Br^-$, $I^-$, $HSO_4^-$, $NO_3^-$ and solutions of low molecular weight alcohols such as methanol and ethanol.

The following Examples illustrate the invention. Polymer concentration is in moles of deprotonated amide bonds per liter of base solution.

EXAMPLE 1

Preparation of PPTA Composites with Randomly Oriented PPTA Fibers

Disks of PPTA pressed pulp were cut to fit in a Buchner funnel. The pulp was washed with water, acetone, and then methylene chloride and finally dried in an oven and degassed by means of a vacuum. The pulp was placed in a Buchner funnel and treated with a 0.12 M PPTA polyanion solution as the potassium salt in DMSO by placing the solution on top of the pulp and pulling it through the pulp by means of a vacuum. [Total contact time 30 minutes]. The polyanion solution permeated the pulp evenly. The pulp was then soaked in water and oven dried. The final product had tensile strength 1938 psi, elongation at break 14.9%, and modulus 96.2 Kpsi. Density measurements show that the polyanion treatment process increases the density of the PPTA pressed pulp by only about 0.01 g/cc. These composites of randomly oriented fibers have the physical appearance of a paper.

EXAMPLE 2

Preparation of PPTA Composites with Oriented PPTA Fibers

Sections of PPTA spun lace were attached to a glass plate by means of tape. A solution of 0.12 M PPTA polyanion as the potassium salt in DMSO was spread on the lace by means of a doctor's blade. The solution was allowed to react with the lace for three minutes and then it was immersed in water to quench the reaction. The sample was then dried under restraint. The resulting product has the appearance of an evenly treated, stiff, but low density material. The final product had tensile strength 2.91 kpsi, elongation at break 34.3% and modulus 185 kpsi.

EXAMPLE 3

Use of $K^+CH_2SOCH_3^-$ for the Preparation of Aramid Composites

A section of PPTA fabric was treated with 0.25M $K^+CH_2SOCH_3^-$ in DMSO for 3 minutes at room temperature. The reaction was quenched with water and air dried. The result was a stiff PPTA fabric.

EXAMPLE 4

Preparation of Stiff Bundles of PPTA Yarn

Eight strands of PPTA yarn (denier 2130) were tightly aligned inside a glass tube, degassed by means of a vacuum and treated with 0.12 M solution of the potassium salt of the PPTA polyanion by filling the glass tube with the solution. The treatment was continued for 24 hours at room temperature and then quenched with water, rinsed liberally with water and acetone, and then air dried. The result was an 18cm×1.5 mm diameter stiff rod composed of PPTA fibers.

EXAMPLE 5

A solution of 1.48 M PMIA polyanion (Nomex TM) as the potassium salt in DMSO was spread over 1 inch×1 inch area of (Nomex TM) pressboard. This was then covered with another piece of such pressboard. After 15 minutes the assembly was immersed in water and then air dried. The resulting bond between the pieces of pressboard was extremely strong as evidenced by a shear strength of 430 psi. When the pieces were pulled apart in an Instron device, it was found that the pressboard itself failed before the interface did. Therefore, this procedure should be general for adhering interfaces of many forms of aramids, such as films, fabrics, and papers.

EXAMPLE 6

Preparation of a Composite with Elongated PPTA Fibers in a PPTA Matrix

In a continuous process, PPTA fibers (Kevlar TM 49) fibers as a yarn were passed through a solution of 0.24 M $K^+PPTA^-$ in DMSO with 2 equivalents of methanol per amide bond. The residence time of the fibers in the solution was approximately 1 second. The yarn was taken up on a steel plate wrapped with polyimide (Kapton TM) film. After one layer of yarn was wrapped on the plate, additional polyanion solution was spread across the fibers by means of a doctor's blade. A second and a third layer of polyanion solution-coated PPTA fibers were applied by an identical procedure. The resulting structure was pressed at room temperature for four hours at 20,000 psi. After that time, the composite was placed in a water bath with continuous change of the water for two hours. The composite was then allowed to air dry for 24 hours at room temperature and then 180° C. for 12 hours. Finally, it was hot-pressed at 300° C. and 20,000 psi for 4 minutes to a uniform, unidirectional, fiber-reinforced PPTA matrix. The final product had tensile strength 211 kpsi, elongation at break 4.7% and modulus 12.9 mpsi.

EXAMPLE 7

Improvement in Strength and Modulus of PPTA Fibrid Sheet by Treatment with 0.5% Sodium Hydroxide in Dimethylsulfoxide A paper sheet was prepared on a screen from 100% freshly prepared PPTA fibrids. The sheet had little cohesion and tensile properties; one half inch fabric strips had tensile strength=0.03 Kpsi and modulus=1.2 Kpsi. The sheet was sprayed with a solution of 0.14 M sodium hydroxide in dimethylsulfoxide till wet, and then dried at 80° C. for 4 hours under reduced pressure. The sheet was then extracted in water to remove residual base and then redried at 80° C. in nitrogen at reduced pressure. The resulting sheet had good cohesion and tensile properties as measured in a similar manner to the starting sheet. Tensile strength 0.32 Kpsi and modulus 25 Kpsi.

EXAMPLE 8

Improvement in The Break Strength of PPTA/PMIA (Kevlar TM /Nomex TM ; 85/15) Paper and 100% Spunlaced PPTA (Kevlar TM ) Fabric on Treatment with DMSO Containing Strong Base PPTA/PMIA (85/15) calandered paper and 100% PPTA spunlaced fabric were cut into 1.5 inch circles and placed on a coarse sintered glass funnel and in separate experiments the following solutions were sucked through and repeated five times:
1. DMSO solvent
2. DMSO+0.05 M potassium t-butoxide
3. DMSO+0.05 M potassium t-butoxide+0.5% methanol
4. DMSO+0.05 M potassium t-butoxide+0.5% methanol+0.5% PPTA
5. DMSO+0.15 M potassium t-butoxide+1.5% methanol+1.5% PPTA.

The treated samples were dried under vacuum for 1 hour, extracted with water 1–2 hours and redried under vacuum. The samples were cut into 0.5×1.25 inch strips and breaking strength measured. Results as shown demonstrate a significant improvement in fabric strength for the treated samples.

| Sample | 1 | 2 | 3 | 4 | 5 |
|---|---|---|---|---|---|
| Fabric* | 2.0 | 7.5 | 3.2 | 3.6 | 10.1 |
| Paper* | 1.9 | 9.5 | 4.3 | 5.9 | 6.0 |

*Values are force to break in pounds.

EXAMPLE 9

Preparation of Bonded PPTA Paper

A section of paper consisting of 85% PPTA fibers and 15% PMIA fibers was anchored tightly to a glass support by means of adhesive tape. The paper was coated with a solution of 0.24 M K+PPTA− in DMSO. After one minute, the coated paper was washed liberally with water, clamped to metal frames to provide restraint during the drying process, and then air dried. The sample was soaked in NMP to remove the PMIA. The sample was washed with acetone and again air dried. The paper was then pressed at 200° C. and 1000 psi for 1 minute to yield a smooth evenly coated sample of PPTA paper. The weight of the resulting product was 84% of the initial weight of the PPTA/PMIA paper, and the product was all PPTA. The mechanical properties of the resulting paper were tensile strength 10.2 kpsi, elongation=3.4%, and modulus=463. The mechanical properties of the untreated paper were tensile strength 2.3 kpsi, elongation=0.69%, tensile modulus 228 kpsi.

EXAMPLE 10

Preparation of Bonded PMIA Paper for Improved Tensile Properties

Sections of commercial PMIA paper were attached to a glass plate by means of adhesive These sections of PMIA paper were treated with: (1) 1.48 M K+PMIA− in DMSO containing 4 equivalents of methanol per amide bond, (2) 0.09 K+PMIA− in DMSO, or (3) 0.5 molar potassium dimsyl in DMSO. All of the samples were subsequently subjected to either 1000 psi pressure for approximately 2 minutes of 10 psi pressure for approximately 2 minutes or 0.06 psi pressure for 1 to 2 minutes. Ambient temperature was used for the reactions. Then the paper samples were soaked in water to quench the anionic sites and to extract out DMSO and salts. The samples were then air dried and tested for tensile properties, density, and thickness of the paper. The results are given in the table below. In all cases, the treated samples are much stiffer and stronger than the untreated control, despite the density of the samples being reduced. Therefore, the specific modulus and the specific tensile strength for these samples is also greater than for the untreated control.

| Treatment | S.A.M. (Kpsi) | S.A.B. (Kpsi) | E.A.B. (%) | Modulus (Kpsi) | Thick. (mils) | Density (g/cm$^3$) |
|---|---|---|---|---|---|---|
| Untreated | 1.72 | — | 15.1 | 60.6 | 5.37 | 0.333 |
| 1;1000 psi | 5.79 | 5.29 | 6.33 | 165 | 7.58 | 0.330 |
| 1;0.06 psi | 3.22 | — | 14.6 | 114 | 8.88 | 0.286 |
| 2;10 psi | 1.23 | — | 17.1 | 55 | 6.20 | 0.285 |
| 2;0.06 psi | 2.83 | — | 16.0 | 53.3 | — | — |
| 3;0.06 psi | 3.96 | 2.71 | 21.8 | 24 | 7.23 | 0.245 |
| 3;1000 psi | 5.49 | 5.28 | 10.4 | 152 | 8.15 | 0.202 |

S.A.M. = Strength at Maximum Tension
S.A.B. = Strength at Break
E.A.B. = Elongation at Break The embodiments of the invention in which an exclusive property or privilege is claimed are defined as follows:

1. A method for adhering aramid structures to one another comprising the steps, in sequence, of
   (i) treating at least one structure with strong base to create anionic sites on the aramid surface,
   (ii) contacting the treated structure with an aramid-containing structure to which it is to be adhered, and
   (iii) reprotonating the anionic sites on the treated structure with a proton donor to adhere said structure to the structure with which it is in contact, said aramid having at least one repeating unit selected from the group:
   (a) —NHR$^{10}$CO—, (b) R$^{11}$—NHCONH—, and (c)

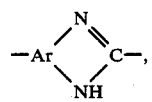

wherein:

$R^{10}$ is selected from R— and $R^{11}NHCOR^{12}$, $R^{11}$ and $R^{13}$, individually, are selected from m-phenylene, p-phenylene, 3,3'-biphenylene, 3,4'-biphenylene, 4,4'-biphenylene and 4,4'-diphenylene ether, $R^{12}$, is selected from $R^{11}$ and $CH_{2x}$, Ar is an aryltriyl radical in which two of the three radical bonds are adjacent to one another and attached to nitrogen atoms, and x is 1 to 10.

2. A method according to claim 1 wherein the aramid is selected from the group:
poly(paraphenylene terephthalamide),
poly(metaphenylene isophthalamide),
poly(parabenzamide),
poly(4,4'-biphenylene isophthalamide),
poly(benzamidizoles),
poly(chloroparaphenylene isophthalamide),
poly (paraphenylene urea), and copolymers containing one or more of them.

3. A method according to claim 2 wherein the structure is in the shape of a fiber.

4. A method according to claim 2 wherein the structure is in the shape of a film.

5. A method according to claim 1 wherein the proton donor is selected from the group water; methanol; ethanol; HX wherein X is F, Cl, Br, or I; $HSO_4^-$, and $NO_3^-$.

6. A method according to claim 2 wherein the proton donor is selected from the group water; methanol; ethanol; HX wherein X is F, Cl, Br, or I; $HSO_4^-$, and $NO_3^-$.

7. A method according to any one of claims 1 to 6 wherein the base is selected from the group:
alkali metal hydroxides;
$R^1R^2N^-$, wherein $R^1$ and $R^2$ are individually selected from the group $C_1$–$C_{12}$ alkyl, $C_6H_5$, $C_{10}H_7$, $C_{12}H_9$, $C(=O)R^3$, $R^3=C_1$–$C_{12}$ alkyl;
$CH_2CN^-$;
$R^4{}^-$, $R^4=C_1$–$C_{12}$ alkyl;
$H^-$;
$R^5SOR^{6-}$, $R^5$ and $R^6=C_1$–$C_{12}$ alkyl;
$R^7O^-$, $R^7=C_1$–$C_{12}$ alkyl; and
aramid polyanions.

* * * * *